Jan. 23, 1940. J. J. BLANC 2,187,929
DEVICE FOR ASSEMBLING PLATES OR OTHER SUPERPOSED PIECES
Filed June 30, 1939
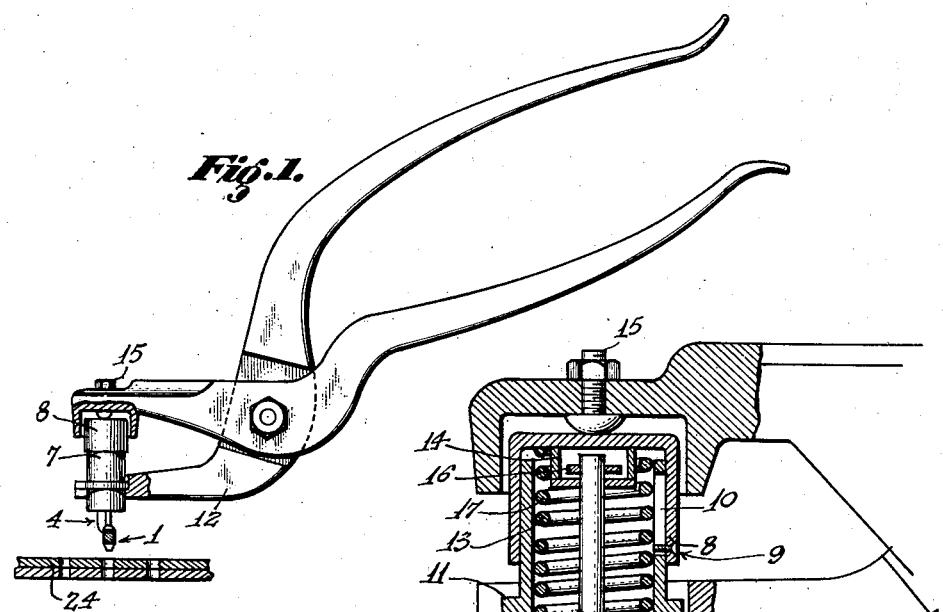

Patented Jan. 23, 1940

2,187,929

UNITED STATES PATENT OFFICE 2,187,929

DEVICE FOR ASSEMBLING PLATES OR OTHER SUPERPOSED PIECES

Jean Julien Blanc, Paris, France

Application June 30, 1939, Serial No. 282,125

11 Claims. (Cl. 85—5)

The present invention has for its object a device for assembling plates or other pieces, destined more particularly but not exclusively for temporary assembling of pieces to be secured together.

Devices of this kind are already known comprising a rod having over a part of its length a diminished cross-section, the said rod cooperating with a finger slidable with respect to said rod and completing the part of the rod having a diminished cross-section in such a way as to form a complete cross-section equal to the normal cross-section of the rod.

For obtaining the sliding movement, the rod is fixed at one of the two parts forming a housing which contains a compression spring tending to separate the said both parts of said housing. For introducing the rod into the holes of the parts to be assembled, the housing formed by the two parts is compressed by a special forked lever. By releasing said forked lever after having introduced the rod into the holes, the finger is advanced thus placing the device in position.

In the device of the kind described above, the rod is slidable with respect to the finger which completes it, but is not rotatable with respect to that finger.

The present invention has for its object inter alia a device of the kind mentioned above, in which the rod may execute, besides the sliding movement, a rotating movement with respect to said finger. This rotating movement which constitutes an essential characteristic of the invention allows of introducing more easily the rod into the holes of the pieces to be assembled or of drawing it back from them.

Other characteristics of the invention will appear from the following specification with reference to the accompanying drawing in which:

Fig. 1 shows the device of the invention placed into the special forked lever ready to be introduced into the holes of the parts to be assembled.

Fig. 2 shows the device partly in section, the spring being compressed.

Fig. 3 shows the device in position.

Fig. 4 shows on a larger scale, a detail of Fig. 2, certain parts being in section.

Fig. 5 represents an enlarged top view of a cross-sectional cut through the device illustrated in Fig. 2 in the plane IV—IV.

Fig. 1 shows the device placed into a forked lever and ready to be put into position. The two parts 7 and 8 respectively of the housing, containing the spring, are spread by the latter. Consequently, a rod 1 occupies the position in which it extends but little out of the housing. The finger 4 is to be introduced into the holes of the pieces to be assembled.

Fig. 2 shows the housing in the position in which the spring contained in it is compressed and in which the rod is in position in the holes of the pieces to be assembled. The housing formed by the parts 7 and 8 which fit into each other contains a strong spring 13. Said two parts are assembled by any appropriate means, e. g. a sunk screw 9 fixed on the part 4 engaging a groove 10 on the part 7. The rod is composed of two parts, of different diameters, 1 and 2 respectively.

The part 2 carries at its upper end a ring 16 which applies itself to a disc 17 having a hole for the passage of the part 2 and being supported by a tube 14 secured in any suitable way to the part 8 of the housing. At an intermediate place, the part 2 is provided with two helicoidal grooves 3 of relatively steep pitch for obtaining the rotating movement of the rod as it will be explained below.

At its lower end, the part 2 carries a part 1 having a larger diameter than the part 2. The part 1 is limited, at the top and at the bottom, by tapered portions 1' and 1'' respectively. The intermediate portion of the part 1 has a file-like surface. After the rod 1—2 is in position, the smaller cross-section of the part 2 is complemented by the projection 5 of the finger 4 carried by the base 6.

As it can be seen on Fig. 5, the finger 4 surrounds nearly completely the part 2 of the rod. The cross-section of the finger 4 is a portion of a circular surface the periphery of which follows substantially the outline of the finger 4 and traverses in its imaginary part a point on the periphery of part 2 diametrically opposite the center point of the circular surface. The projection 5 substantially follows with its inner surface the outer contours of the part 1 of the rod 1—2.

The rotation of the rod is obtained in the following manner: The part 2 of the rod is provided with two helicoidal grooves of relatively steep pitch engaging two pins 21 (Fig. 4) carried by a ring 20. The lower surfaces 23 of said ring which bears against the base 6 of the finger is knurled as well as the corresponding portion of the base. When the forked lever 12 is compressed, the stud 15 having a spherical head presses upon the upper face of the part 8 of the housing. The lower part 7 of the housing is provided with a shoulder 11 which applies itself to a corresponding shoulder of the forked lever. The spring contained in the housing is thus compressed and the rod comes out of the housing. During this movement, the ring 20 carrying the pins 21 is pressed with its knurled face 23 to the base 6 of the finger. While the ring is held in place by its knurled portion, the pins 21 engaged in the helicoidal grooves 3 cause the rod to rotate. When the forked lever is released, the spring 13 expands drawing thus the rod back into the housing. During this drawing back movement, the ring 20 bears against a disc 19 secured in any suitable manner (e. g. by means of screws 22) to a tubular piece 18 fixed in any way upon the base 6 of the finger 4.

As the upper face of the ring 20 as well as the corresponding under surface of the disc 19 are smooth, the ring 20 will rotate while the pins slide along the grooves 3, without causing the rotation of the rod 1—2. If it is desired that the rod rotate both when coming out and when drawn back, it is necessary to secure ring 20 to the base 6 omitting the parts 18—19 and 22.

The device works as follows:

After having placed the device into the forked lever, the rod is brought into a position facing the holes into which it has to be introduced, e. g. rivet holes of two plates to be assembled. Then the operator compresses the forked lever pressing at the same time in the longitudinal sense of the device. By this compression, the rod comes out of the housing executing at the same time a rotating movement which facilitates the entering of the rod into the hole. The file-like surface of the part 1 serves at the same time for cleaning off burrs which may be on the border of the holes. When the portion 1" has passed through the hole, the plates bear against the shoulder 25 formed by the recess of the rod from the portion 1" to the part 2. When then releasing the forked-lever, the expansion of the spring 13 causes the part 7 of the housing to go down, and also the finger 4 which engages in the remaining portion of the holes unoccupied by the part 2 of the rod. Finally, the lower face of the part 7 of the housing bears against the upper plate thus securely holding together the pieces to be assembled.

For withdrawing te device, the operator compresses the housing by means of the forked lever which forces the finger out of the holes causing said finger to slide along the rod remaining in position till the finger has gone out. Then, the rod may be drawn back after disengaging the shoulder 25 by a lateral movement.

Other forms and applications of the invention will suggest themselves to those skilled in the art.

What I claim as new is:

1. A temporary rivet comprising a rod, a first projection extending transversely from the first end of said rod, a second projection extending transversely from said rod and slidable with respect thereto at least substantially up to said first projection, a finger carried by said second projection extending therefrom along said rod toward the first end of said rod, said rod being rotatable with respect to said finger, a spring positioned and of a force sufficient to securely hold together in the bite defined by said first and second projections, at least two perforated metal plates in perforate alignment.

2. A temporary rivet comprising a rod, a first projection extending transversely from the first end of said rod, a second projection extending transversely from said rod and slidable with respect thereto at least substantially up to said first projection, a finger of uniform cross-section carried by said second projection extending therefrom along said rod toward said first end, said rod being rotatable with respect to said finger, a spring positioned and of a force sufficient to securely hold together in the bite defined by said first and second projection at least two perforated metal plates in perforate alignment.

3. A temporary rivet comprising a rod, a first projection extending transversely from the first end of said rod, a second projection extending transversely from said rod and slidable with respect thereto at least substantially up to said first projection, a finger carried by said second projection extending therefrom along said rod toward the first end of said rod, said finger defining part of a cylinder in which the outermost edge of said rod is substantially coincident with the projected cylindrical surface, said rod being rotatable with respect to said finger, a spring positioned and of a force sufficient to securely hold together in the bite defined by said projection and said collar at least two perforated metal plates in perforate alignment.

4. A temporary rivet comprising a rod, a first projection extending transversely from the first end of said rod, a second projection extending transversely from said rod and slidable with respect thereto at least substantially up to said first projection, a finger carried by said second projection extending therefrom along said rod toward the first end of said rod, said rod being rotatable with respect to said finger, and means for bringing said projections into clamping position with sufficient force to securely hold together in the bite defined by said first and second projections, at least two perforated metal plates in perforate alignment.

5. A temporary rivet comprising a rod, a first projection extending transversely from the first end of said rod and provided with tapered borders at the top and the bottom, a second projection extending transversely from said rod and slidable with respect thereto, a finger carried by said second projection extending therefrom along said rod toward said first end, said rod being rotatable with respect to said finger, a spring positioned and of a force sufficient to securely hold together in the bite defined by said first and second projection at least two perforated metal plates in perforate alignment.

6. A temporary rivet in accordance with claim 5 in which said first projection, intermediate said tapered borders at the top and the bottom thereof, has a substantially file-like peripheral surface.

7. A temporary rivet comprising a rod, a first projection extending transversely from the first end of said rod, a second projection extending transversely from said rod and slidable with respect thereto, a finger carried by said second projection extending therefrom along said rod toward the first end of said rod, a spring positioned and of a force sufficient to securely hold together in the bite defined by said first and second projections at least two perforated metal plates in perforate alignment and means for rotating said rod while moving said first projection away from said finger.

8. A temporary rivet in accordance with claim 7 in which said first projection has a substantially file-like peripheral surface.

9. A temporary rivet comprising a rod, a first projection extending transversely from the first end of said rod, a second projection extending transversely from said rod and slidable with respect thereto, a finger carried by said second projection extending therefrom along said rod toward the first end of said rod, said finger defining part of a cylinder in which the outermost edge of said rod is coincident with the projected cylindrical surface, a spring positioned and of a force sufficient to securely hold together in the bite defined by said first and second projections at least two perforated metal plates in perforate alignment and means for rotating said rod while moving said first projection away from said finger.

10. A temporary rivet in accordance with claim 9 in which said first projection has a substantially file-like peripheral surface.

11. A temporary rivet in accordance with claim 9 in which said first projection defines a tapered end having a substantially file-like peripheral surface.

JEAN JULIEN BLANC.